April 28, 1936. M. R. TREMBOUR 2,039,040
METHOD OF MAKING COMPOSITE METAL STOCK
Original Filed April 14, 1933
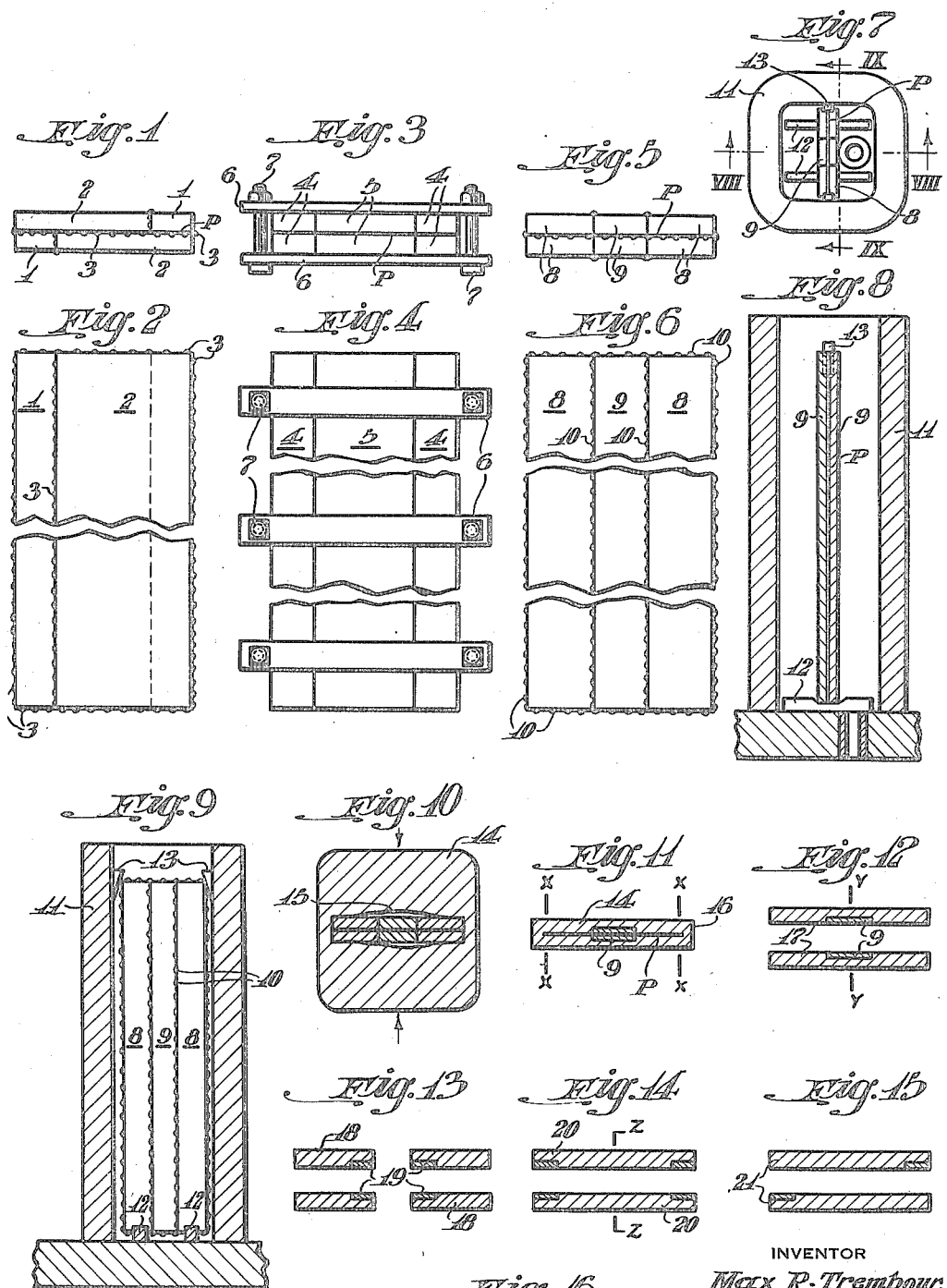

UNITED STATES PATENT OFFICE 2,039,040

METHOD OF MAKING COMPOSITE METAL STOCK

Max R. Trembour, Beaver, Pa., assignor to Jessop Steel Company, Washington, Pa., a corporation of Pennsylvania Continuation of application Serial No. 666,189, April 14, 1933. This application January 22, 1934, Serial No. 707,672

12 Claims. (Cl. 29—188)

This invention relates to the manufacture of bimetallic flat section steel bars and tools composed of a body of relatively cheap steel having welded in one corner thereof an insert of a harder, or special, steel.

Shear blades, machine knives, and the like tools are made from tool steels, for example, from high carbon steels, plain or alloyed, or highly alloyed heat or wear-resisting steels, such as high-speed tool steels, high carbon-high chromium steels, and the like. In most tools of this type only the cutting edge needs to be hard and resistant to wear, i. e., one of the four corners of the tool. Because of this and because the special steels used are generally rather expensive it would be economically advantageous to have only the required small proportion of the total mass of the tool consist of the special hard steel, the balance of the tool consisting of a mild steel which is cheap and easily processed.

Such composite stock can not be made by the pressure welding procedures commonly used with plain carbon steels, as experience has shown that the special and highly alloyed steels can not be welded thereby. In a copending application filed by me on February 9, 1932, Serial No. 591,816, I have disclosed and claimed a method of making bimetallic stock which is predicated upon my discovery that satisfactory pressure welding of common to special steels can be accomplished readily by wholly enclosing the special steel within the common steel near a corner or end of a composite ingot formed of the two steels. Thus, according to that process a bar or plate of the special steel, having its surfaces carefully cleaned, is supported near a corner of a mold, but out of contact therewith, and mild steel is cast in the mold to totally envelop the insert. The ingot is hot rolled without breaking the envelope of mild steel, whereby welding occurs, and the billet is then rolled to shape and size it.

The process just described is generally useful, but it is particularly suited for the production of certain bar shapes, such as automobile body die stock, whose special metal inserts are of plain or lightly alloyed high carbon steels. The unsymmetrical distribution of the inserts in the ingot section may, however, cause certain operating difficulties in the case of special steels whose ductility is markedly different from that of the body metal at rolling temperatures.

The major object of this invention is to provide a method of producing bimetallic tool stock which overcomes or minimizes the disadvantages referred to, is readily practiced, productive of a plurality of pieces of such stock from a single ingot, provides satisfactory welding between the special, or tool, steel insert and the mild steel body, is particularly adapted for the production of stock embodying inserts of highly alloyed steels which are very hard and stiff at rolling temperatures, and which embodies other advantages which will appear from the following description.

The invention may be described in connection with the accompanying drawing, in which Figs. 1 and 2 are, respectively, a top plan view and a side elevation of one form of insert adapted for the practice of the invention; Figs. 3 and 4 views similar to Figs. 1 and 2, showing another form of insert; Figs. 5 and 6 views similar to Figs. 1 and 2, showing still another embodiment of the invention; Fig. 7 a plan view of an ingot mold with an insert arranged therein; Figs. 8 and 9 longitudinal sectional views through the mold shown in Fig. 7, taken on the lines VIII—VIII, IX—IX, respectively; Figs. 10 and 11 cross sections, respectively, of an ingot formed in the mold shown in Figs. 7 to 9 and of a plate rolled therefrom; Fig. 12 a cross section of a pair of plates produced from the rolled plate shown in Fig. 11; Fig. 13 a cross sectional view through four pieces of composite stock produced from the plates shown in Fig. 12; Fig. 14 a view similar to Fig. 13 showing the product obtained by the use of the insert shown in Figs. 3 and 4; Fig. 15 a view similar to Figs. 13 and 14 of the product obtained from the insert of Figs. 1 and 2; and Fig. 16 a cross section of an insert showing a still further modification of the invention.

This invention is predicated upon my discovery that flat section composite tool stock of the type referred to can be produced readily and cheaply from ingots comprising a body of cheap steel having wholly enclosed therein, a plurality of inserts of special steel arranged symmetrically relative to the ingot section on opposite sides of and adjacent to a layer of weld-preventing material which forms a plane dividing the ingot interiorly into halves.

The invention is predicated further on my discovery that the required positioning of the bars of special steel and the necessary internal division of the ingot into separable complementary halves may be had by the use of a special type of insert.

In accordance with the invention the inserts are built up from two groups of bars, or plates, of cheap steel and of special steel. The bars in each group are disposed side by side, and the special steel bars are arranged so that the groups are complementary and the special steel will be disposed symmetrically in the ingot section. The two groups are placed back to back with a layer of weld-preventing material separating them, and they are fastened together to form the insert. The outer faces of the special steel bars, and their sides adjacent the laterally positioned cheap steel bars are cleaned to put them in weldable condition. The inserts are made of such width that their edges will lie close to, but out of contact with, the sides of the mold, whereby the ingot will be divided almost from side to side by the weld-preventing material.

The insert is supported in a suitable mold, out of contact therewith, and so as to divide it into halves, and cheap steel is cast into it to completely enclose the insert. This forms a composite ingot in which the insert is wholly surrounded by an envelope of cheap steel.

The ingot is then hot rolled between ordinary cylindrical rolls to effect welding between the inserts and body metal and to form a plate approximately twice the thickness of the desired stock, and upon removing the marginal edges of mild steel to expose the dividing plane referred to, the plate is separated to form stock of the thickness desired and having permanently welded thereto an insert of special, or tool, steel. In some embodiments of the invention, such as those shown in Figs. 3, 4, and 14 to 16, the stock is produced directly with the special metal welded to a corner, or edge of the cheap body metal. In other embodiments, e. g., as shown in Figs. 5 to 12, the plates obtained on parting the rolled material, as just described, are cut longitudinally through the insert to obtain stock with the special metal welded in a corner, as seen in Fig. 13.

Thus the special type of insert used provides for production of a plurality of pieces of stock from an ingot, and for ready parting of the rolled plate. Any difficulty which might otherwise occur from differences in ductility of the two metals at rolling temperatures is obviated by the symmetrical arrangement of the special steel, which avoids unequal stresses.

Having reference now to the drawing, Figs. 1 and 2 show an insert suitable for use in the practice of the invention. It comprises two complementary groups of bars 1 of tool steel and bars 2 of mild steel. In each group there is a tool steel bar 1 and a bar 2 of mild steel. The groups are disposed back to back with bars 1 arranged to be symmetrical to the ingot section, as shown in Fig. 1, and the groups are fastened fixedly together in any suitable manner to produce the composite ingot.

In order to permit the ingot to be parted after rolling it is necessary that means be provided to act as an unweldable dividing plane between the groups. To this end the two groups of bars 1 and 2 are separated by a layer P of weld-preventing material. This may be formed in various ways known to the art, as by coating the inner face of either or both of the groups of bars with a suitable material, such as magnesia, or some other inert oxide, mixed with a suitable binder, e. g., water glass.

It is important that the two groups making up the insert do not separate during casting and permit the cheap metal to enter between them, as this would interfere with or prevent the attainment of satisfactory results. For this reason the groups are fastened together in fixed position. As just indicated, this may be done in various ways, but it is preferred to weld the bars of each group, and also the two groups, to make the insert. The welding may be continuous along the edges of the bars and groups, but for most purposes it suffices to weld at intervals by deposition of metal by an arc or torch welding apparatus, the welded spots of deposited metal being indicated at 3, Figs. 1 and 2.

The inserts may be made up in a variety of other ways, as will be understood. For example, instead of using two bars of tool steel and four of mild steel, the insert may comprise four bars of tool steel 4 and two of mild steel 5, Figs. 3 and 4, arranged in two complementary groups connected together with an intervening unweldable dividing plane P. In this case the mild steel bars lie centrally in the groups.

Another mode of fastening the insert components is shown in connection with this embodiment. After the bars are assembled in groups and the groups placed back to back with the layer P between them, they are clamped together with straps 6 connected by bolts or rivets 7, these being suitably of the cheap metal used in casting the ingot.

Still another embodiment of insert is shown in Figs. 5 and 6. This comprises two complementary groups disposed on opposite sides of an unweldable plane P, each being formed of two mild steel bars 8 and a tool steel bar 9. In this embodiment the tool steel bars lie centrally in the groups, and each is flanked on each side by a mild steel bar 8. The groups are welded in spot fashion as described hereinabove, and as indicated at 10.

The composite insert, such as that of Figs. 5 and 6, is then supported in an ingot mold 11 in such position as to divide the mold into rectangular halves, and so that mild steel may be cast around it, as shown in Figs. 7 to 9. In order to reduce the amount of mild steel that must be cropped off after rolling, to expose the dividing plane, it is preferred to make the insert as wide as possible while maintaining its edges out of contact with the mold walls, so that the dividing plane extends almost from edge to edge of the ingot. Satisfactory results may be obtained by the use of inserts whose width is from about ½ to 1 inch less than the mold, whereby the edges of the insert are spaced from ¼ to ½ inch from the mold walls.

The insert is supported in the mold and spaced from the bottom by stirrup members 12, for example, made from mild steel. Likewise, the insert does not extend to the top of the mold, so that its top will be covered with a substantial section of mild steel when the ingot is cast. If desired, the top of the insert may be held in position by wedges 13, and if desirable these may be removed as the body of cast metal moves toward the top of the insert. The insert shown in Figs. 7 to 9 is the embodiment shown and described in connection with Figs. 5 and 6, but it will be understood that the invention is not limited thereto, this being purely for purposes of description.

Mild steel 14 is then cast into the mold to entirely envelop the insert and form a composite ingot. The mold shown is adapted for bottom casting, although the metal may be cast from the top, if desired, without affecting the character of the invention.

There is thus produced a composite ingot which is divided internally by an unweldable dividing plane into similar parts each having embedded therein an insert of tool steel which is to be welded to the body of mild steel. Experience has shown that little, if any, welding takes place between the cast mild steel and the tool steel bars in the casting operation. This may be shown by sectioning an ingot as cast and before rolling. It will be found that the mild steel is not welded to the insert, and that, for the most part, it is not even in contact therewith, as indicated at 15, Fig. 10.

If it is attempted to pressure weld bars of mild steel and special steels of the type contemplated herein by heating them to welding temperature and passing them between rolls, no satisfactory or permanent weld can be formed. This is true no matter how carefully the surfaces of the bars be cleaned before rolling. For this reason it has been thought that such combinations of steels are not susceptible of pressure welding.

The present invention is predicated in part upon my discovery that these materials can be pressure welded provided the surfaces of the tool steel bar which are to be welded are preliminarily placed in clean metallic, or weldable, condition, and provided further that access of air and other oxidizing gases to the surfaces to be welded be entirely prevented during the pressure welding operation. This is the purpose of completely enclosing the insert within a continuous envelope of the body metal. Thereby all access of oxidizing gases is prevented, and even though no welding whatever takes place in the casting operation, and even though the two metals are not in complete contact in the ingot as cast, as described hereinabove, satisfactory, complete and permanent welding occurs when the ingot is rolled, provided the continuity of the envelope be maintained until welding is complete.

The surfaces of the tool steel bars which are to be welded to the body of mild steel, i. e., the sides of bars 1, 5 and 9 and the faces opposite those covered with weld-preventing material, are carefully and thoroughly cleaned prior to casting the ingot. This may be done by pickling or sandblasting the bar, or in other ways which remove the scale, grease, dirt, and the like. Where pickling is used the bars should be dried carefully and so as to avoid oxidation. The bars of mild steel are also cleaned in similar manner. Usually it will be desirable to anneal the tool steel bars prior to assembling the inserts.

The ingot thus prepared is then hot rolled to effect welding, by passing it between horizontal rolls with the dividing plane parallel to the axis of the rolls, so that maximum pressure is applied to the major faces which are to be welded, i. e., in the direction of the arrows, Fig. 10. The rolling should be conducted so as to effect only elongation of the ingot, with a relatively small amount of spreading, which can be done in ways known to the art. There is no particular advantage in edging, which may, in fact, lead to certain difficulties, and for this reason no edging passes are required during the rolling operation. The rolling operation is continued to form a plate 16, Fig. 11, approximately twice the thickness of the final stock.

The temperature of rolling should not be lower, but need not be higher, than that suitable for the rolling of plates of the special metal used in the insert. As a rule this temperature will be considerably lower than the so-called welding temperatures, particularly for special metal inserts of high carbon content. The best temperature is the lowest at which the ductility of the hard steel approaches that of the soft steel.

Since most unalloyed, or lightly alloyed, steels attain this degree of ductility at a much lower temperature than highly alloyed steels, such as high-speed steel, the best rolling temperature for composite ingots or billets containing the former will usually be in the neighborhood of 2000° F., while those containing highly alloyed tool steels will usually have to be rolled at a temperature several hundred degrees higher.

A section of the plate rolled from the ingot is shown in Fig. 11. The bars of each group have been welded to the adjacent cast mild steel and to each other, and since bars 8 were of the same composition as cast mild steel 14 the dividing lines therebetween (Fig. 10) have disappeared. The plate is divided by plane P into two complementary parts each comprising a homogeneous body portion of mild steel 14 and an insert 9 of tool steel completely welded thereto. The marginal portions of the plates are then removed, for example, by cutting or shearing along lines X—X, Fig. 11, to expose the dividing plane P, whereupon the plate may be readily parted into two plates 17, Fig. 12. Each of these is approximately the thickness of the stock desired. Upon cutting these plates longitudinally through the center of the insert along line Y—Y, Fig. 12, there are thus formed four lengths of flat section bimetallic stock, Fig. 13, each consisting of a body portion 18 of mild steel having an insert 19 of tool steel welded to one corner thereof.

The treatment in the case of other types of insert is like that just described. For instance, the insert shown in Figs. 3 and 4 produces a pair of plates shown in Fig. 14. In this case the plates are cut along their center Z—Z to form four lengths of stock 20 similar to those shown in Fig. 13.

The insert shown in Figs. 1 and 2 is particularly adapted to the production of larger plates. This produces two plates 21, Fig. 15, each having an insert welded in one corner, and is adapted for the production of larger shear knives and the like than the stock shown in Figs. 13 and 14.

I have found also that in some instances it may be preferable to use a separate sheet or plate to form the dividing plane instead of, or in addition to, applying a weld-preventing coating to the inner surfaces of the insert plates, as described hereinabove. This embodiment preferably takes the form of a sheet 23, Fig. 16, of ordinary steel interposed between the two groups 24 of the insert and having both of its surfaces covered with a weld-preventing coating 25, such as an inert oxide, as described hereinabove. Or, the surfaces of the sheet may be oxidized by heat, to produce a tightly adherent and uniform layer of scale which forms a very satisfactory weld preventative. This is less apt to spall off and to result in welded spots than where artificially applied weld preventatives are used. Where the ingot is to be subjected to a considerable amount of reduction, and consequently where the amount of weld-preventing material per unit of area of contact surface may ultimately become very slight, there is danger, particularly in the case of easily weldable steels, that the film of weld-preventing material may be broken during rolling, resulting in welding at some spots. For this reason the use of this modified embodiment is desirable. This composite insert is fastened together by welding, or by straps and bolts, as described previously, or in any other manner which will prevent entry of metal during casting but will permit parting of the rolled product.

Mild steel has been referred to herein as the preferred example of the cheap body metal used in the practice of this invention, and the harder special steels have been designated as tool steel. These terms are used also in the claims, but it will be understood that as used herein and in the claims they are intended generically to include cheap steels and harder special steels applicable to the purposes of the invention.

This application is a continuation of my co-pending application Serial No. 666,189, filed April 14, 1933.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a method of manufacturing flat bimetallic tool stock composed of a body of mild steel having an insert of tool steel welded to one corner thereof, the step comprising forming a composite ingot by casting mild steel entirely around a composite insert comprising two groups of mild steel bars and tool steel bars connected together in fixed back-to-back relation with a layer of weld-preventing material therebetween, each group comprising a central bar of tool steel and two bars of mild steel positioned longitudinally one on each side of the tool steel bar with its longitudinal edge contacting the adjacent edge of said tool steel bar.

2. In a method of manufacturing flat bi-metallic tool stock composed of a body of mild steel having an insert of tool steel welded to one corner thereof, the step comprising forming a composite ingot by casting mild steel around a composite insert comprising two groups of mild steel and tool steel bars connected in fixed back-to-back relation with a layer of weld-preventing material between the groups, said groups being complementary and the bars in each group being disposed longitudinally side by side in a common vertical plane.

3. In a method of manufacturing flat bi-metallic tool stock composed of a body of mild steel having an insert of tool steel welded to one corner thereof, the step comprising forming a composite ingot by casting mild steel around a composite insert comprising two groups of mild steel and tool steel bars connected in fixed back-to-back relation with a layer of weld-preventing material between the groups, the bars in each group being disposed longitudinally side by side in a common vertical plane, and the tool steel bars being positioned in the groups to lie symmetrically in the ingot section.

4. In a method of manufacturing flat bi-metallic tool stock composed of a body of mild steel having an insert of tool steel welded to one corner thereof, the step comprising forming a composite ingot by casting mild steel around a composite insert comprising two groups of mild steel and tool steel bars, the bars in each group being disposed longitudinally side by side in a common vertical plane, the bars in each group being welded together along their contiguous edges, and the groups being connected in fixed back-to-back relation with a layer of weld-preventing material between the groups.

5. In a method of manufacturing flat bi-metallic tool stock composed of a body of mild steel having an insert of tool steel welded to one corner thereof, the steps comprising disposing in an ingot mold a composite insert positioned to divide the ingot into halves, said insert comprising two groups of mild steel and tool steel bars connected in fixed back-to-back relation with a layer of weld-preventing material between the groups, said groups being complementary and the bars in each group being disposed longitudinally side by side in a common vertical plane, casting mild steel around said insert to completely enclose it, and working the ingot.

6. In a method of manufacturing bi-metallic tool stock composed of a body of mild steel having an insert of tool steel welded to one corner thereof, the steps comprising forming a composite ingot by casting mild steel entirely around a composite insert positioned to divide the ingot into halves, the insert comprising two complementary groups of mild steel and tool steel bars connected in fixed back-to-back relation with a layer of weld-preventing material between the groups, the bars in each group being disposed longitudinally side by side in a common vertical plane, and hot rolling the ingot between cylindrical rolls with said layer parallel to the roll axes.

7. In a method of manufacturing flat bi-metallic tool stock composed of a body of mild steel having an insert of tool steel welded to one corner thereof, the steps comprising forming a composite ingot by casting mild steel around a composite insert comprising two complementary groups of mild steel and tool steel bars connected in fixed back-to-back relation with a layer of weld-preventing material between the groups, the bars in each group being disposed longitudinally side by side in a common vertical plane with the tool steel bars disposed symmetrically in the ingot section, the exterior surfaces of said insert being in clean weldable condition prior to said casting, hot rolling the ingot to effect welding between the insert and the body of mild steel and to form a plate approximately twice as thick as that of the desired flat stock, removing marginal metal from the plate to expose said weld-preventing material, and parting the plate along said plane.

8. That method of making flat tool stock composed of a body of mild steel having at one corner a welded insert of tool steel, comprising supporting in an ingot mold an insert comprising a plurality of mild steel and tool steel bars disposed in two complementary groups, the bars in each group being disposed longitudinally side by side in a common vertical plane with the edges of the bars in a group in contact, groups of the insert being fastened together in fixed back-to-back relation with a layer of weld-preventing material completely separating the groups, the remaining surfaces of the bars being in weldable condition, casting mild steel around the insert to form a composite ingot, hot rolling the ingot with said layer parallel to the roll axes to effect welding between the insert and the body of mild steel and to form a plate approximately twice as thick as the thickness of the flat stock, removing marginal metal from the plate to expose the said weld-preventing material, and parting the plate along said plane.

9. That method of making flat tool stock composed of a body of mild steel having at one corner a welded insert of tool steel, comprising supporting in an ingot mold an insert comprising a plurality of mild steel and tool steel bars disposed in two complementary groups, the bars in each group being disposed vertically side by side in a common vertical plane, the groups of the insert being fastened together in fixed back-to-back relation with a layer of weld-preventing material completely separating the groups, the remaining surfaces of the bars being in weldable condition, casting mild steel around the insert to form a composite ingot, hot rolling the ingot to elongate it, with substantially no spreading, to form a plate approximately twice as thick as the thickness of the flat stock, removing marginal metal from the plate to expose the said weld-preventing material, and parting the plate along said plane.

10. That method of making flat tool stock composed of a body of mild steel having at one corner a welded insert of tool steel, comprising supporting in an ingot mold to divide it into halves an insert comprising a plurality of mild steel and tool steel bars disposed in two complementary groups with the tool steel bars symmetrically in the ingot section, the bars in each group being disposed longitudinally side by side in a common vertical plane, the groups of the insert being fastened together in fixed back-to-back relation with a layer of weld-preventing material completely separating the groups, the remaining surfaces of the bars being in weldable condition, casting mild steel around the insert to form a composite ingot, rolling the ingot, with substantially no spreading, to form a plate approximately twice as thick as the thickness of the flat stock, removing marginal metal from the plate to expose the said weld-preventing material, and parting the plate along said plane.

11. The method of making flat tool stock composed of a body of mild steel having at one corner a welded insert of tool steel, comprising arranging tool steel bars and mild steel bars to form two complementary groups each comprising mild steel and tool steel bars disposed longitudinally side by side in a common vertical plane with their edges in contact and with the tool steel bars arranged to be symmetrical to the ingot section, positioning the groups on opposite sides of a plate of steel coated on both faces with weld-preventing material and connecting the groups together in fixed back-to-back relation, the outer surface of the insert being in clean weldable condition, supporting the insert in an ingot mold out of contact therewith, casting mild steel around the insert to completely envelop it and form a composite ingot, hot rolling the ingot to elongate it and form a plate, removing marginal metal from the plate to expose said weld-preventing material, and parting the rolled plate along the plane formed by said weld-preventing material.

12. The method of making flat tool stock composed of a body of mild steel having at one corner a welded insert of tool steel, comprising arranging tool steel bars and mild steel bars to form two complementary groups each comprising mild steel and tool steel bars disposed longitudinally side by side in a common vertical plane, positioning the groups on opposite sides of a plate of steel coated on both faces with weld-preventing material and connecting the groups together in fixed back-to-back relation, supporting the insert in an ingot mold out of contact therewith to divide it into halves, casting mild steel around the insert to completely envelop it and form a composite ingot, hot rolling the ingot with said coated plate parallel to the roll axes to elongate it and form a rolled plate, removing marginal metal from the rolled plate to expose said weld-preventing material, and parting the rolled plate along the plane formed by said weld-preventing material.

MAX R. TREMBOUR.